(12) United States Patent
Hans et al.

(10) Patent No.: US 11,912,067 B2
(45) Date of Patent: Feb. 27, 2024

(54) RUBBER COMPOSITION AND A TIRE

(71) Applicant: The Goodyear Tire & Rubber Company, Akron, OH (US)

(72) Inventors: Michael Hans, Trier (DE); Christian Jean-Marie Kaes, Schrondweiler (LU); Claude Schweitzer, Colmar-Berg (LU); Xavier Jean-Francois Beot, Heinsch (BE)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 258 days.

(21) Appl. No.: 17/123,291

(22) Filed: Dec. 16, 2020

(65) Prior Publication Data

US 2021/0188007 A1    Jun. 24, 2021

Related U.S. Application Data

(60) Provisional application No. 62/951,148, filed on Dec. 20, 2019.

(51) Int. Cl.
*B60C 11/00* (2006.01)
*B60C 1/00* (2006.01)
*C08L 9/00* (2006.01)

(52) U.S. Cl.
CPC ........ *B60C 11/0008* (2013.01); *B60C 1/0016* (2013.01); *B60C 11/005* (2013.01);
(Continued)

(58) Field of Classification Search
CPC . B60C 11/0008; B60C 1/0016; B60C 11/005; B60C 2011/0025; B60C 11/12;
(Continued)

(56) References Cited

U.S. PATENT DOCUMENTS 10,427,463 B2 * 10/2019 Schweitzer ......... B60C 11/0041
10,626,254 B1    4/2020 Delville et al.
(Continued)

FOREIGN PATENT DOCUMENTS

EP    2033812 B1    3/2009
EP    2457742 A1    5/2012
(Continued)

*Primary Examiner* — Arrie L Reuther
*Assistant Examiner* — Shibin Liang
(74) *Attorney, Agent, or Firm* — Alvin T. Rockhill (57) ABSTRACT

In a first aspect, the present invention is directed to a tire comprising a belt portion and a tread portion radially outward of the belt portion, wherein the tread portion comprises a radially outer tread layer for contacting the road when driving and a radially inner tread layer arranged between the radially outer tread layer and the belt portion, wherein the radially outer tread layer comprises a first rubber composition having a first shear storage modulus G'1 and the radially inner tread layer comprises a second rubber composition having a second shear storage modulus G'2, wherein the second shear storage modulus G'2 is between 3 MPa and 9 MPa higher than the first shear storage modulus G'1, and wherein the first shear storage modulus G'1 ranges from 1 MPa to 3 MPa and the second shear storage modulus G'2 ranges from 4 MPa to 12 MPa.

19 Claims, 4 Drawing Sheets

(52) U.S. Cl.
CPC ......... *C08L 9/00* (2013.01); *B60C 2011/0025* (2013.01); *C08L 2205/03* (2013.01)

(58) Field of Classification Search
CPC ... B60C 11/00; B60C 1/00; C08L 9/00; C08L 2205/03
See application file for complete search history.

(56) References Cited

U.S. PATENT DOCUMENTS

| | | | | |
|---|---|---|---|---|
| 2004/0261926 | A1* | 12/2004 | Ozel | B60C 11/005 152/209.5 |
| 2007/0175557 | A1* | 8/2007 | Puhala | C08L 9/00 152/209.5 |
| 2010/0186859 | A1* | 7/2010 | Zhao | C08L 9/00 152/209.5 |
| 2015/0107735 | A1* | 4/2015 | Djelloul-Mazouz | B60C 11/0058 152/209.1 |
| 2015/0306921 | A1* | 10/2015 | Hiraiwa | B60C 17/0009 152/517 |
| 2018/0117972 | A1 | 5/2018 | Perrin et al. | |
| 2019/0308455 | A1 | 10/2019 | Perrin | |
| 2020/0231787 | A1 | 7/2020 | Brace et al. | |
| 2021/0178829 | A1* | 6/2021 | Zivkovic | B60C 11/0323 |
| 2022/0355626 | A1* | 11/2022 | Prou | B60C 19/002 |

FOREIGN PATENT DOCUMENTS

| | | | | |
|---|---|---|---|---|
| EP | 2865543 | A1 | | 4/2015 |
| EP | 3323633 | A1 | | 5/2018 |
| WO | 2016174100 | A1 | | 11/2016 |
| WO | 2018100275 | A1 | | 6/2018 |
| WO | 2019092364 | | * | 5/2019 ............. B60C 11/04 |
| WO | 2019187001 | | * | 10/2019 ............... B60C 1/00 |

* cited by examiner

RUBBER COMPOSITION AND A TIRE

This application claims benefit of U.S. Provisional Patent Application Ser. No. 62/951,148, filed on Dec. 20, 2019. The teachings of U.S. Provisional Patent Application Ser. No. 62/951,148 are incorporated herein by reference in their entirety.

FIELD OF THE INVENTION

The present invention relates to a tire and a rubber composition for a tire, in particular for a tire tread. The tires of this invention are comprised of a belt portion and a tread portion which is situated radially outward from the belt portion, wherein the tread portion comprises a radially outer tread layer which is adapted to be ground contacting and for contacting the road when driving and a radially inner tread layer arranged between the radially outer tread layer and the belt portion.

BACKGROUND OF THE INVENTION

While tire performance has improved significantly over recent decades there remains to be a demand to continuously strive for further improvements in grip and handling in high performances applications. In particular, there is a current and continuing desire for high performance tires which provide higher levels of grip and stiffness for better vehicle handling characteristics. However, these two properties are typically in conflict with each other and it is typically difficult to improve one without compromising the other. In other words, tire tread formulations that simultaneously improve both of these characteristics have generally proven to be elusive. A similar conflict exists in the endeavor to develop tire tread formulations which exhibit low rolling resistance for improved fuel economy and high stiffness for high performance handling characteristics.

SUMMARY OF THE INVENTION

One object of the present invention may be to provide a tire providing advanced stiffness properties and/or handling performance.

Another object of the present invention may be to provide an advanced tire tread construction.

Another object of the present invention may be to provide a rubber composition comprising advanced stiffness properties, preferably at limited hysteresis.

The scope of protection of the present invention is defined by the independent claims, further preferred embodiments are recited in the dependent claims and the aspects and embodiments provided in the summary and description as provided below.

In a first aspect, the present invention is directed to a tire comprising a belt portion and a tread portion radially outward of the belt portion, wherein the tread portion comprises a radially outer tread layer for contacting a road when driving and a radially inner tread layer arranged between the radially outer tread layer and the belt portion, wherein the radially outer tread layer comprises a first rubber composition having a first shear storage modulus (G'1), the radially inner tread layer comprises a second rubber composition having a second shear storage modulus (G'2), and wherein the second shear storage modulus G'2 is 3 MPa to 9 MPa higher than the first shear storage modulus G'1. Furthermore, the first shear storage modulus G'1 ranges from 1 MPa to 3 MPa and the second shear storage modulus G'2 ranges from 4 MPa to 12 MPa, wherein the first shear storage modulus G'1 and the second shear storage modulus G'2 are been determined according to ASTM D5992.

Providing a radially outer tread layer with a limited stiffness and a radially inner tread layer (such as a tread base layer, also called sometimes "undertread", or a radially inner layer of a multi-layer tread cap) with a considerably higher layer stiffness, while relying on the properties of the radially outer tread layer which is adapted to be ground contacting for driving on roads, and other paved and unpaved surfaces when driving. This higher stiffness of the tread base layer helps to significantly improve tire handling performance, including, for instance, dry grip and/or cornering stiffness which is of particular importance in handling performance at higher speeds.

In an embodiment, the first shear storage modulus G'1 ranges from 1 MPa to 2.5 MPa. These values represent values of a radially outer tread layer which contacts the road upon driving and which has a relatively small stiffness, wherein, as known in the tire art, G' is considered as a stiffness indicator.

In another embodiment, the second shear storage modulus G'2 ranges from 5.5 MPa to 10 MPa, or, ranges optionally from 6 MPa to 9 MPa. Such values are significantly higher than the corresponding G'1 values of said radially outer tread layer.

In still another embodiment, the second shear storage modulus G'2 is within the range of 3.5 MPa to 6 MPa higher than the first shear storage modulus G'1. These values represent still a considerably difference between G'1 and G'2 which helps to improve the handling performance by keeping the properties of the outer(most) tread cap layer and enjoying the benefit of the high stiffness of the inner tread layer.

In yet another embodiment, the first shear storage modulus G'1 ranges from 1 MPa to 2.5 MPa, the second shear storage modulus G'2 ranges from 5.5 to 9 MPa, and the second shear storage modulus G'2 is within the range of 3.5 MPa to 7 MPa higher than the first shear storage modulus G'1.

In still another embodiment, the tread portion comprises a tread cap and a tread base, wherein the radially outer tread layer is a layer of the tread cap and wherein the radially inner tread layer is a tread base layer (also sometimes called an undertread) of the tread base. In general, the tread cap could also have multiple tread layers, in particular arranged radially on top of one another. Such an arrangement is sometimes referred to as a "multi-cap".

In still another embodiment, the tread portion comprises a tread cap and, optionally, a tread base arranged radially inward of the tread cap, wherein the radially outer tread layer and the radially inner tread layer are comprised in the tread cap. In other words, the tread may comprise a tread base, but such a tread base is not required. The radially inner tread layer could be either a tread base layer or undertread or a radially inner tread layer of a tread cap having multiple layers (e.g. 2, 3 or 4 layers).

In still another embodiment, the tire further comprises a plurality of circumferential grooves and circumferential ribs, wherein, optionally, two neighboring circumferential grooves define (or confine) one of the circumferential ribs, and wherein the radially inner tread layer comprises an electrically conductive chimney extending to the radially outermost surface of the tread portion for contacting the road when driving. Such a conductive chimney is of particular importance in applications where the rubber formulation used in making the outer tread layer includes a high level of reinforcing silica and little or no carbon black. Optionally, such a conductive chimney extends radially through one of the ribs and is preferably axially spaced apart from the neighboring grooves. In addition, or alternatively, all grooves are confined or formed by the composition of the radially outer tread layer (which is compositionally distinct from the second rubber composition). Thus, the conductive chimney does not extend to the sidewalls of the circumferential grooves. Still optionally, the radially inner tread layer is free of radial extensions contacting circumferential grooves and/or the radially outermost surface of the radially outer tread layer. In another option, the radially inner tread layer is free of any radial extensions extending radially into the radially outer tread layer.

In another embodiment, the tangent delta (or tan delta) of the first rubber composition is higher than 0.2, as determined according to ASTM D5992. In particular, this is typically the case for ultra-high performance compositions. Such compositions are for instance used if good grip and/or handling properties are desired.

G' measurements are determined in accordance with ASTM D5992 (-96, reapproved 2018) and are carried out at 6% strain, a frequency of 7.8 Hz, and 70° C. with a Metravib DMA+ (Dynamic Mechanical Analyzer) 450 device of the ACOEM group.

Tangent delta (tan δ) has been determined as G"/G', wherein G" (shear loss modulus) has also been determined under the conditions given herein.

Further details include carrying out the test with a circular double-shear specimen according to ASTM D5992 (comprising two rubber samples), wherein each rubber sample has the shape of a circular disk with a thickness of 1.1 mm and a diameter of 5 mm. Measurements are carried out in strain sweep mode (changing strain at constant temperature), in first run (cycle), starting at zero strain and increasing strain at least up to 6% strain. The temperature of 70° C. is kept constant over the whole measurement. The rubber samples are taken out of the (cured) tire.

In another embodiment, the tangent delta of the first rubber composition ranges from 0.2 to 0.4. This still applies to more specific examples to compositions targeting grip and/or handling properties.

In still another embodiment, tangent delta of the first rubber composition ranges from 0.05 to 0.15. Such values are typical for a low rolling resistance composition. Optionally, the tangent delta value of the first rubber composition is at least 0.1 or preferably even at least 0.15 smaller than the tangent delta of the second rubber composition. In particular, the tangent delta of the second rubber composition could be in the range of 0.2 to 0.35.

In another embodiment, the radially inner tread layer has, over at least 80% of its axial width, a radially thickness ranging from 10% to 80% of the maximum (or largest) radial thickness of the radially outer tread layer. Optionally, the radially outer tread layer is the only tread or tread cap layer provided radially outside of the radially inner layer. In another embodiment, said radial thickness ranges from 20% to 80%. In another embodiment, the tread portion comprises two axially spaced apart circumferential shoulder ribs and multiple circumferential center ribs, wherein the radially inner tread layer has a radial thickness which is within the range of 25% to 50% of the radial distance between the radially outermost surface of the center ribs and the radially inner side (or surface) of the radially inner tread layer.

In still another embodiment, the radially inner tread layer has over its whole axial width a radial thickness ranging from 20% to 80% of the maximum radial thickness of the radially outer tread layer. In particular, the radially inner tread layer may also be relatively thick so as to further help supporting the radially outer tread layer(s) with its superior stiffness.

In still another embodiment, the second rubber composition is comprised of from 75 phr to 90 phr of a (first) diene-based elastomer selected from one or more of cis 1,4-polyisoprene having a cis content of more than 90% and a solution polymerized styrene-butadiene rubber (SSBR), from 10 phr to 25 phr of cis-1,4 polybutadiene rubber having a glass transition temperature ranging from −85° C. to −110° C., from 40 to 80 phr of a filler comprising from 40 to 80 phr carbon black and from 0 phr to 40 phr silica, less than 10 phr of plasticizer (such as oil and/or liquid polymers, in other words less than 10 phr of oil and/or liquid polymers), or optionally less than 5 phr of such plasticizers, from 20 phr to 50 phr of a methylene acceptor composition comprising a phenol formaldehyde and an alkyl phenol formaldehyde, and from 1 phr to 10 phr of a methylene donor composition comprising or consisting of hexamethylenetetramine.

In still another embodiment, the second rubber composition is comprised of from 75 phr to 90 phr of a (diene-based) elastomer comprising cis-1,4-polyisoprene having a cis content of more than 90%, from 10 phr to 25 phr of cis-1,4 polybutadiene rubber having a glass transition temperature ranging from −85° C. to −110° C., from 45 phr to 70 phr of a filler comprising from 45 to 70 phr carbon black and from 0 phr to 25 phr silica, less than 10 phr of plasticizer (such as oil and/or liquid polymers), or optionally less than 5 phr of plasticizer (such as oil and/or liquid polymers), from 25 phr to 45 phr of a methylene acceptor composition comprising a phenol formaldehyde and an alkyl phenol formaldehyde, from 1 phr to 5 phr of a methylene donor composition comprising or consisting of hexamethylenetetramine, and from 2 phr to 4 phr of sulfur (or optionally from 2 phr to 3.5 phr of sulfur).

In still another embodiment, the alkyl phenol formaldehyde is an octyl phenol formaldehyde.

In still another embodiment, the methylene acceptor composition comprises from 15 phr to 25 phr of the phenol formaldehyde and from 12 phr to 17 phr of octyl phenol formaldehyde and the second rubber composition comprises from 2 to 4 phr sulfur. In particular, it may be desirable to reduce the octyl phenol formaldehyde to such a level as it has been found by the inventors that higher amounts of octyl phenol formaldehyde resin are undesirable in view of increased hysteresis. It has further been found by the inventors that this particular combination of phenol formaldehyde, octyl phenol formaldehyde, hexamethylenetetramine and sulfur in the composition provides most desirable processing parameters with regards to the desired cured compound stiffness, limited uncured viscosity (for acceptable handling of green tire tread during tire building) and limited compound stickiness during hot processing such as mixing and milling and sufficient compound stickiness for tire building at ambient temperature. The relatively high sulfur level particularly allows for a better balance between high and low strain cured compound stiffness.

In still another embodiment, the second rubber composition comprises from 2 phr to 4 phr hexamethylenetetramine. In still another embodiment, the ratio between the methylene acceptor composition and the methylene donor composition ranges from 10:1 to 15:1.

In another embodiment, the alkyl phenol formaldehyde has a softening point ranging from 80° C. to 100° C. and the phenol formaldehyde has a softening point ranging from 100° C. to 120° C. Such softening points of the resins have been found to positively impact green stiffness and tackiness of the compound.

In another embodiment, the first rubber composition is comprised of from 70 phr to 100 phr of a solution polymerized styrene-butadiene rubber (solution styrene-butadiene rubber), from 0 phr to 30 phr of polybutadiene rubber and/or from 0 phr to 30 phr polyisoprene, from 80 phr to 150 phr of a filler, including 20 phr to 120 phr silica, from 40 phr to 100 phr of carbon black (or from 40 to 70 phr of carbon black), and from 20 phr to 50 phr of an oil (or even from 30 phr to 50 phr of an oil). Such high-performance compounds have a high content of filler, in particular, typically carbon black. Under heavy handling, these compounds heat up and a significant drop in stiffness is observed, which is negative for the handling properties such as cornering stiffness. Especially in such situations, the second rubber composition can help to significantly mitigate such effects caused in combination with said first rubber composition, in particular by helping to maintain a good pattern block stiffness and at the same time allowing to achieve the wanted grip performance of the first rubber composition.

In another embodiment, the first rubber composition comprises from 70 phr to 100 phr of solution polymerized styrene-butadiene rubber, from 0 phr to 30 phr polyisoprene, between 30 phr and 90 phr of a filler, wherein the filler preferably comprises less than 10 phr of carbon black (preferably within the range of 1 phr to 5 phr) and the amount of silica compared to carbon black (by weight/phr) is at least 10:1. Preferably, the amount of resin is also lower than 10 phr, for instance within the range of 5 phr to 9 phr. In another embodiment, the total amount of filler in the first composition is within a range of from 40 phr to 80 phr or even from 40 phr to 70 phr.

In particular, tread cap compounds having a relatively low filler content for achieving an improved rolling resistance performance tend to have weaknesses in dry handling performance. Such a drawback can be significantly improved by using the second composition described herein.

In a second aspect of the invention, a rubber composition for a tire is provided, the rubber composition comprising from 75 phr to 90 phr of an elastomer (or a first elastomer) selected from one or more of cis-1,4-polyisoprene having a cis content of more than 90% and a solution polymerized styrene-butadiene rubber (SSBR), from 10 phr to 25 phr of cis-1,4 polybutadiene rubber having a glass transition temperature ranging from −85° C. to −110° C., from 45 phr to 70 phr of a filler comprising from 45 phr to 70 phr carbon black, and from 0 phr to 25 phr silica, less than 10 phr (or less than 5 phr) of plasticizer (such as oil and/or liquid polymer), from 25 phr to 45 phr of a methylene acceptor composition comprising a phenol formaldehyde and an alkyl phenol formaldehyde, from 1 phr to 5 phr of a methylene donor composition comprising a hexamethylenetetramine, and from 2 phr to 4 phr of sulfur. Such a composition has turned out to offer high stiffness and to be suitable as rubber composition for supporting layers in a tread, which are arranged radially inside of at least one radially outer tread layer for contacting the road when driving.

In one embodiment, the alkyl phenol formaldehyde is an octyl phenol formaldehyde. It has been found that the provision of octyl phenol formaldehyde increases further the stiffness and, apart from that, also the tack of the rubber layer could be improved. In another embodiment, the methylene acceptor composition comprises from 15 phr to 25 phr of the phenol formaldehyde and from 12 phr to 17 phr of octyl phenol formaldehyde.

In still another embodiment, the composition comprises from 2 phr to 4 phr of the hexamethylenetetramine. In still another embodiment, the phr ratio between the methylene acceptor composition and the methylene donor composition ranges from 10:1 to 15:1. In still another embodiment, the alkyl phenol formaldehyde has a softening point ranging from 80° C. to 100° C. and the phenol formaldehyde has a softening point ranging from 100° C. to 120° C., as determined according to ASTM E-28 or equivalent.

In still another embodiment, the rubber composition has a shear storage modulus G' ranging from 5 MPa to 10 MPa, as determined according to ASTM D5992. Optionally, G' ranges from 5.5 MPa to 8 MPa or from 5.5 MPa to 7 MPa. In an embodiment, one or more of the rubber compositions described herein, e.g. the first and/or the second rubber composition, may include at least one and/or one additional diene-based rubber. Representative synthetic polymers may be the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter may be acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g. acrolein, methyl isopropenyl ketone and vinylethyl ether. Specific examples of synthetic rubbers include neoprene (polychloroprene), polybutadiene (including cis 1,4-polybutadiene), polyisoprene (including cis 1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. Preferred rubbers or elastomers may be in general natural rubber, synthetic polyisoprene, polybutadiene and SBR including SSBR.

In another embodiment, the composition may comprise at least two diene-based rubbers. For example, a combination of two or more rubbers is preferred such as cis-1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers, and emulsion polymerization prepared butadiene/acrylonitrile copolymers.

In another embodiment, in particular in the first rubber composition, an emulsion polymerization derived styrene/butadiene (ESBR) might be used having a bound styrene content which is within the range of 20 percent to 28 percent, for some applications, an ESBR having a medium to relatively high bound styrene content, namely, a bound styrene content which is within the range of 30 percent to 45 percent. In many cases the ESBR will have a bound styrene content which is within the range of 26 percent to 31 percent. By emulsion polymerization prepared ESBR, it may be meant that styrene and 1,3-butadiene are copolymerized as an aqueous emulsion. Such are well known to those skilled in such art. The bound styrene content can vary, for example, from 5 percent to 50 percent. In one aspect, the ESBR may also contain acrylonitrile to form a terpolymer rubber, as ESBAR, in amounts, for example, of 2 weight percent to 30 weight percent bound acrylonitrile in the terpolymer. Emulsion polymerization prepared styrene/butadiene/acrylonitrile copolymer rubbers containing 2 weight percent to 40 weight percent bound acrylonitrile in the copolymer may also be contemplated as diene-based rubbers.

In another embodiment, in particular in the first rubber composition, solution polymerization prepared SBR (SSBR) may be used. Such an SSBR may for instance have a bound styrene content in a range of 5 percent to 50 percent, preferably 9 percent to 36 percent, and most preferably 26 percent to 31 percent. The SSBR can be conveniently prepared, for example, by anionic polymerization in an inert organic solvent. More specifically, the SSBR can be synthesized by copolymerizing styrene and 1,3-butadiene monomer in a hydrocarbon solvent utilizing an organo lithium compound as the initiator. In still another embodiment, the solution styrene butadiene rubber is a tin-coupled polymer. In still another embodiment, the SSBR is functionalized for improved compatibility with silica. In addition, or alternatively the SSBR is thio-functionalized. This helps to improve stiffness of the compound and/or its hysteresis behavior. Thus, for instance, the SSBR may be a thio-functionalized, tin-coupled solution polymerized copolymer of butadiene and styrene.

In one embodiment, a polyisoprene (rubber) may be used. For instance, synthetic cis-1,4-polyisoprene and cis-1,4-polyisoprene natural rubber are as such well known to those having skill in the rubber art and could be used within the examples of the present invention. In particular, the cis 1,4-microstructure content is normally at least 90% and is typically at least 95% or even higher.

In one embodiment, e.g. in the first and/or second rubber composition, cis-1,4-polybutadiene rubber (BR or PBD) is used. Suitable polybutadiene rubbers may be prepared, for example, by organic solution polymerization of 1,3-butadiene. The BR may be conveniently characterized, for example, by having at least a 90 percent cis-1,4-microstructure content ("high cis" content) and a glass transition temperature (Tg) in a range of from −95 to −110° C. Suitable polybutadiene rubbers are available commercially, such as Budene® 1207, Budene® 1208, Budene® 1223, or Budene® 1280 from The Goodyear Tire & Rubber Company. These high cis-1,4-polybutadiene rubbers can for instance be synthesized utilizing nickel catalyst systems which include a mixture of (1) an organonickel compound, (2) an organoaluminum compound, and (3) a fluorine containing compound as described in U.S. Pat. Nos. 5,698,643 and 5,451,646, which are incorporated herein by reference.

A glass transition temperature, or Tg, of an elastomer or elastomer composition, where referred to herein, represents the glass transition temperature(s) of the respective elastomer or elastomer composition in its uncured state or possibly a cured state in the case of an elastomer composition. A Tg can be suitably determined as a peak midpoint by a differential scanning calorimeter (DSC) at a temperature rate of increase of 10° C. per minute, according to ASTM D3418.

The term "phr" as used herein, and according to conventional practice, refers to "parts by weight of a respective material per 100 parts by weight of rubber, or elastomer". In general, using this convention, a rubber composition is comprised of 100 parts by weight of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 phr to 10 phr, optionally from 1 phr to 5 phr, of one or more additional diene-based rubbers, such as SBR, SSBR, ESBR, PBD/BR, NR and/or synthetic polyisoprene. In another example, the composition may include less than 5 phr, preferably less than 3 phr of an additional diene-based rubber or be also essentially free of such an additional diene-based rubber. The terms "compound" and "composition" and "formulation" may be used herein interchangeably, unless indicated otherwise.

In an embodiment, the rubber composition may also include oil, in particular processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils may include various oils as are known in the art, including aromatic, paraffinic, naphthenic, vegetable oils, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Some representative examples of vegetable oils that can be used include soybean oil, sunflower oil, canola (rapeseed) oil, corn oil, coconut oil, cottonseed oil, olive oil, palm oil, peanut oil, and safflower oil. Soybean oil and corn oil are typically preferred vegetable oils.

In an embodiment, the rubber composition may include silica. Commonly employed siliceous pigments which may be used in the rubber compound include for instance conventional pyrogenic and precipitated siliceous pigments (silica). In one embodiment, precipitated silica is used. The conventional siliceous pigments may be precipitated silicas such as, for example, those obtained by the acidification of a soluble silicate, e.g., sodium silicate. Such conventional silicas might be characterized, for example, by having a BET surface area, as measured using nitrogen gas. In one embodiment, the BET surface area may be in the range of 40 to 600 square meters per gram ($m^2/g$). In another embodiment, the BET surface area may be in a range of 50 to 300 square meters per gram. The BET surface area can be suitably determined according to ASTM D6556 or equivalent and is described in the Journal of the American Chemical Society, Volume 60, Page 304 (1930). The conventional silica may also be characterized by having a dibutylphthalate (DBP) absorption value in a range of 100 $cm^3/100$ g to 400 $cm^3/100$ g, alternatively 150 $cm^3/100$ g to 300 $cm^3/100$ g which can be suitably determined according to ASTM D 2414 or equivalent. A conventional silica might be expected to have an average ultimate particle size, for example, in the range of 0.01 to 0.05 micron as determined by the electron microscope, although the silica particles may be even smaller, or possibly larger, in size. Various commercially available silicas may be used, such as, only for example herein, and without limitation, silicas commercially available from PPG Industries under the Hi-Sil trademark with designations 210, 315G, EZ160G, etc; silicas available from Solvay, with, for example, designations of Z1165MP and Premium200MP, etc. and silicas available from Evonik AG with, for example, designations VN2 and Ultrasil 6000GR, 9100GR, etc.

In still another embodiment, the rubber composition may comprise pre-silanized and precipitated silica which may for instance have a CTAB adsorption surface area of between 130 m$^2$/g and 210 m$^2$/g, optionally between 130 m$^2$/g and 150 m$^2$/g and/or between 190 m$^2$/g and 210 m$^2$/g, or even between 195 m$^2$/g and 205 m$^2$/g. The CTAB (cetyl trimethyl ammonium bromide) method for determination of the silica surface area (ASTM D6845) is known to the person skilled in the art.

In another embodiment, pre-silanized, or in other words pre-hydrophobated, precipitated silica utilized is hydrophobated prior to its addition to the rubber composition by treatment with at least one silane. Suitable silanes include but are not limited to alkylsilanes, alkoxysilanes, organoalkoxysilyl polysulfides and organomercaptoalkoxysilanes.

Silica couplers may be used (silica coupling agent) such as (A) bis(3-trialkoxysilylalkyl) polysulfide containing an average in range of from about 2 to about 4, alternatively from about 2 to about 2.6 or from about 3.2 to about 3.8, sulfur atoms in its connecting bridge, or (B) an alkoxyorganomercaptosilane, or (C) their combination. A representative example of such bis(3-trialkoxysilylalkyl) polysulfide is comprised of bis(3-triethoxysilylpropyl) polysulfide. As indicated, for the pre-silanized precipitated silica, the silica coupler may be desirably an alkoxyorganomercaptosilane. For the non-pre-silanized precipitated silica, the silica coupler may be desirably comprised of the bis(3-triethoxysilylpropyl) polysulfide.

In one embodiment, the rubber composition is exclusive of addition of silica coupler to the rubber composition (thereby exclusive of silica coupler).

As indicated, in one embodiment, the rubber composition may contain a combination of additional silica coupler added to the rubber composition, particularly a bis(3-triethoxysilylpropyl) polysulfide containing an average of from about 2 to about 4 connecting sulfur atoms in its polysulfidic bridge together with an additional precipitated silica (non-pre-silanized precipitated silica) added to said rubber composition, wherein the ratio of pre-silanized precipitated silica to said precipitated silica is desirably at least 8/1, alternately at least 10/1.

In an embodiment, the rubber composition may include carbon black.

Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades. These carbon blacks have iodine absorptions ranging from 9 to 145 g/kg and a DBP number ranging from 34 to 150 cm$^3$/100 g. Iodine absorption values can be suitably determined according to ASTM D1510 or equivalent.

In one embodiment, the rubber composition may contain a conventional sulfur containing organosilicon compounds or silanes. Examples of suitable sulfur containing organosilicon compounds are of the formula:

Z-Alk-S$_n$-Alk-Z    I in which Z is selected from the group consisting of where R$^1$ is an alkyl group of 1 to 4 carbon atoms, cyclohexyl or phenyl; R$^2$ is an alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be where R$^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4. In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, CH$_3$(CH$_2$)$_6$C(=O)—S—CH$_2$CH$_2$CH$_2$Si(OCH$_2$CH$_3$)$_3$, which is available commercially as NXT™ from Momentive Performance Materials. In another embodiment, suitable sulfur containing organosilicon compounds include those disclosed in United States Patent Application Publication No. 2003/0130535. In one embodiment, the sulfur containing organosilicon compound is Si-363 from Degussa. The amount of the sulfur containing organosilicon compound in a rubber composition may vary depending on the level of other additives that are used. Generally speaking, the amount of the compound may range from 0.5 phr to 20 phr. In one embodiment, the amount will range from 1 phr to 10 phr or from 1 phr to 5 phr.

In another embodiment, the rubber composition may be essentially cobalt free, e.g. comprise less than 0.5 phr or less than 0.1 phr cobalt salt or even less than 0 phr cobalt salt. It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Some representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may for instance be used in an amount ranging from 0.5 phr to 8 phr, alternatively with a range of from 1.5 phr to 6 phr. Typical amounts of tackifier resins, if used, comprise for example 0.5 phr to 10 phr, usually 1 phr to 5 phr. Typical amounts of processing aids, if used, comprise for example 1 to 50 phr (this may comprise in particular oil). Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3 phr. Typical amounts of waxes, if used, may for example comprise 1 phr to 5 phr. Often microcrystalline waxes are used. Typical amounts of peptizers, if used, may for instance comprise 0.1 phr to 1 phr. Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate. In one embodiment, a single accelerator system may be used, i.e., primary accelerator. The primary accelerator(s) may be used in total amounts ranging from 0.5 phr to 4 phr, alternatively 0.8 phr to 1.5, phr. In another embodiment, combinations of a primary and a secondary accelerator might be used with the secondary accelerator being used in smaller amounts, such as from 0.05 phr to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are for instance amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be for instance a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely, at least one nonproductive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) of the preceding nonproductive mix stage(s). The terms "nonproductive" and "productive" mix stages are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature which is within the range of 140° C. to 190° C. The appropriate duration of the thermomechanical working varies as a function of the operating conditions, and the volume and nature of the components. For example, the thermomechanical working may be from 1 to 20 minutes.

Vulcanization of the pneumatic tire of the present invention may for instance be carried out at conventional temperatures ranging from 100° C. to 200° C. In one embodiment, the vulcanization is conducted at temperatures ranging from 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

In a third aspect of the invention, a tire and/or a tire tread is provided, the tire and/or tire tread comprising a radially outer tread layer for contacting a road when driving and a radially inner tread layer supporting (e.g. directly or indirectly) the radially outer tread layer, wherein the radially inner tread layer comprises the rubber composition in accordance with said second aspect or on or more of its embodiments.

In another embodiment, the tread may comprise a tread cap and optionally a tread base, wherein the radially outer tread layer may be a layer of the tread cap and the radially inner tread layer may be a layer of the tread cap or tread base. In an embodiment, a tire of the present invention may for example be a pneumatic tire or nonpneumatic tire, a race tire, a passenger car tire, a truck tire, a motorcycle tire, or an aircraft tire. The tire may also be a radial or bias tire.

The features of the above aspects and/or embodiments as well as of the description may be combined with one another other.

BRIEF DESCRIPTION OF THE DRAWINGS

The structure, operation, and advantages of the invention will become more apparent upon contemplation of the following description taken in conjunction with the accompanying drawings, wherein.

DETAILED DESCRIPTION OF THE INVENTION

Figure 1:
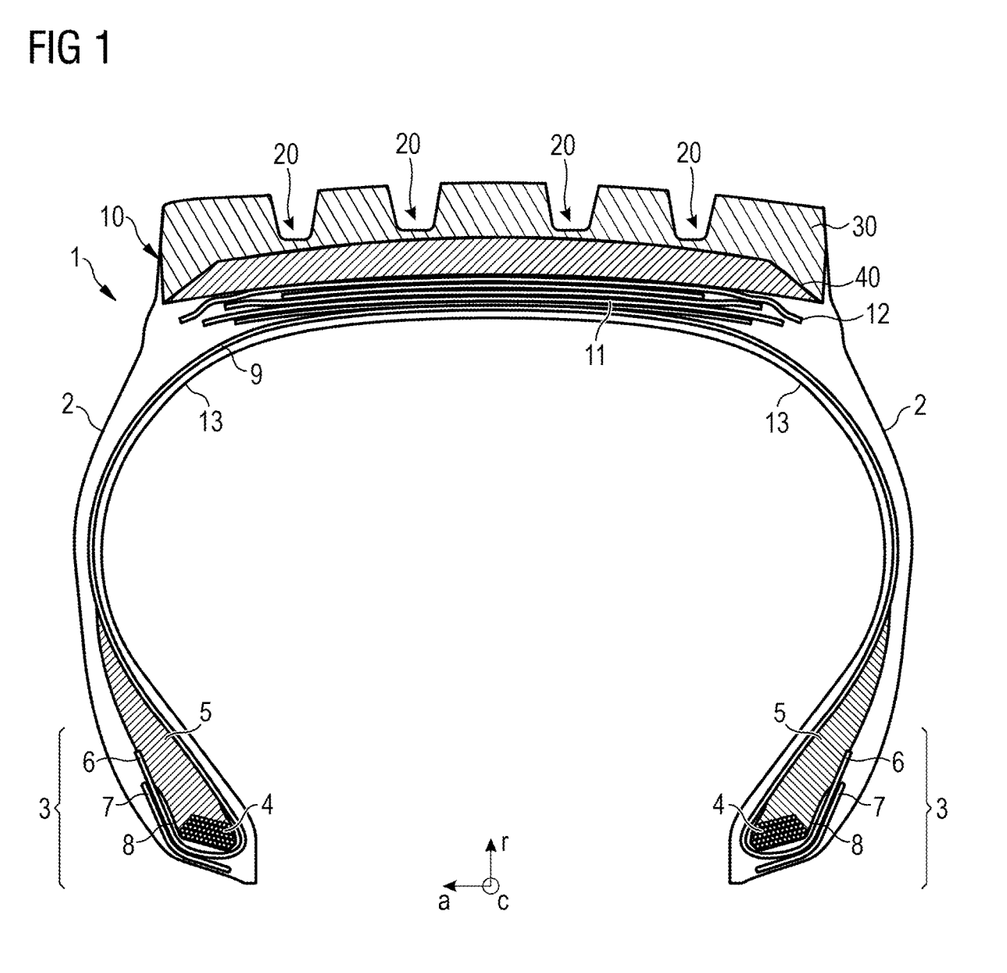
FIG. 1 is a schematic cross section of a tire comprising multiple tread cap layers.

FIG. 1 is a schematic cross-section of a tire 1. The tire 1 has a tread (or tread portion) 10, an inner liner 13, a belt structure (or belt portion) comprising four belt plies 11, a carcass ply 9, two sidewalls 2, and two bead regions 3 comprising bead filler apexes 5 and beads 4. The example tire 1 is suitable, for example, for mounting on a rim of a vehicle, e.g. a truck or a passenger car. As shown in FIG. 1, the belt plies 11 may be covered by an overlay ply 12. The carcass ply 9 includes a pair of axially opposite end portions 6, each of which is associated with a respective one of the beads 4. Each axial end portion 6 of the carcass ply 9 may be turned up and around the respective bead 4 to a position to anchor each axial end portion 6. The turned-up portions 6 of the carcass ply 9 may engage the axial outer surfaces of two flippers 8 and axial inner surfaces of two chippers 7. As shown in FIG. 1, the example tread 10 may have four circumferential grooves 20, each groove typically defining a U-shaped opening in the tread 10. The tread 10 or tread portion comprises in accordance with FIG. 1 two tread cap layer layers 30, 40 arranged radially on top of each other, wherein the radially outer tread cap layer 30 is supported by the radially inner tread cap layer 40. As is illustrated in FIG. 1 the radially inner tread cap layer 40 extends under the entire axial width of the radially outer tread cap layer 30. Alternatively, the tread 10 could comprise one or more further tread cap layers and/or a tread base layer arranged radially inside of the tread cap (not shown). In accordance with the present embodiment of the invention, the radially inner tread layer 40 comprises a compound having a higher shear storage modulus (G') than the radially outer tread layer 30. In particular, such a difference may amount to at least 4 MPa according to a nonlimiting example of the invention. Such an embodiment provides the radially outer tread layer 30 with a stiff base, stiffer than the compound of the radially outer tread layer 30. Preferably, the radial thickness of the radially inner tread layer 40 ranges over at least 80% of its axial width from 20% to 80% of the maximum radial thickness of the radially outer tread cap layer 30. This relatively large thickness helps to provide an even better support for the radially outer tread layer 30.

The radially outer tread layer 30 could comprise different tread compounds having a stiffness ranging from 1 MPa to 3 MPa. When reference is made to a stiffness herein in MPa, this shall be understood as the corresponding shear storage modulus G'. In other words, these compounds could for instance be high performance compounds or low rolling resistance compounds, depending on the intended use of the tire.

Tables 3 and 4 provide some examples of suitable compounds for a radially outer tread layer 30. While the embodiment of FIG. 1 suggests a plurality of tire components including for instance apexes 5, chippers 7, flippers 8 and overlay 12, such components are not mandatory for the invention. Also, the turned-up end of the carcass ply 9 is not necessary for the invention or may pass on the opposite side of the bead area 3 and end on the axially inner side of the bead 4 instead of the axially outer side of the bead 4. The tire could also have for instance more or less than four grooves.

The axial direction a (in other words a direction in parallel to the axis of rotation of the tire 1), the radial direction r and the circumferential direction c have been indicated as common in the tire art. The terms axial direction a, radial direction r and circumferential direction c shall not be limited to a specific orientation unless otherwise provided herein.

Figure 2:
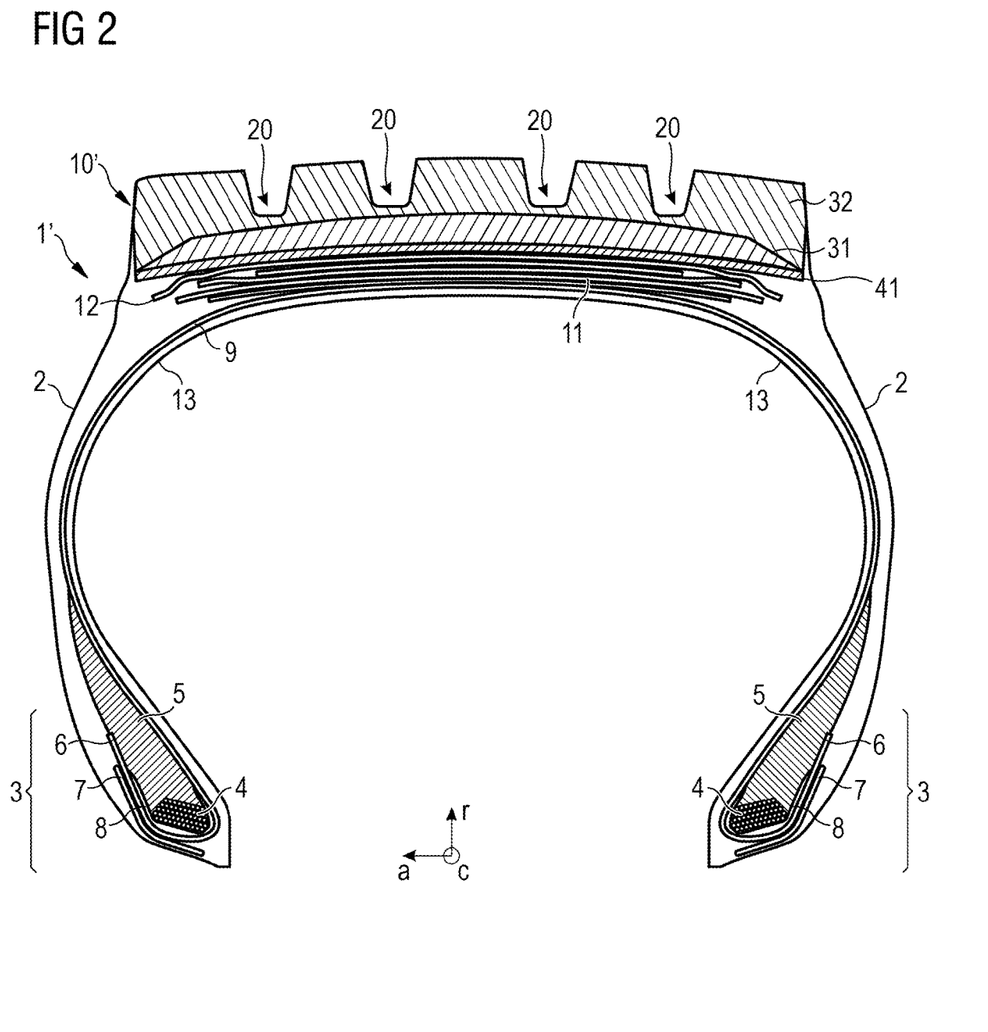
FIG. 2 is a schematic cross section of a tire comprising multiple tread cap layers and a tread base layer.

FIG. 2 shows another tire 1' in accordance with another embodiment of the present invention. For the sake of easier reference, the same reference numerals as in FIG. 1 have been used in FIG. 2 where applicable. In contrast to the tread 10 or tread portion according to FIG. 1, the tread 10' or tread portion of FIG. 2 comprises a tread base layer 41, and a tread cap radially outside of the tread base layer 41, wherein the tread cap comprises a first tread cap layer 31 radially outside of the tread base layer 41 and a second tread cap layer 32 arranged radially outside or on top of the first tread cap layer 31. In the present example, it is the tread base layer 41 having a shear storage modulus G' that is at least 4 MPa larger than the shear storage modulus, preferably of each one, of the tread cap layers 31, 32. As is illustrated in FIG. 2 the tread base layer 41 extends under the entire axial width of the first tread cap layer 31 which extends under the entire axial width of the second tread cap layer 32. Accordingly, the tread base layer 41 extends under the entire axial width of both the first tread cap layer 31 and the second tread cap layer 32.

Figure 3:
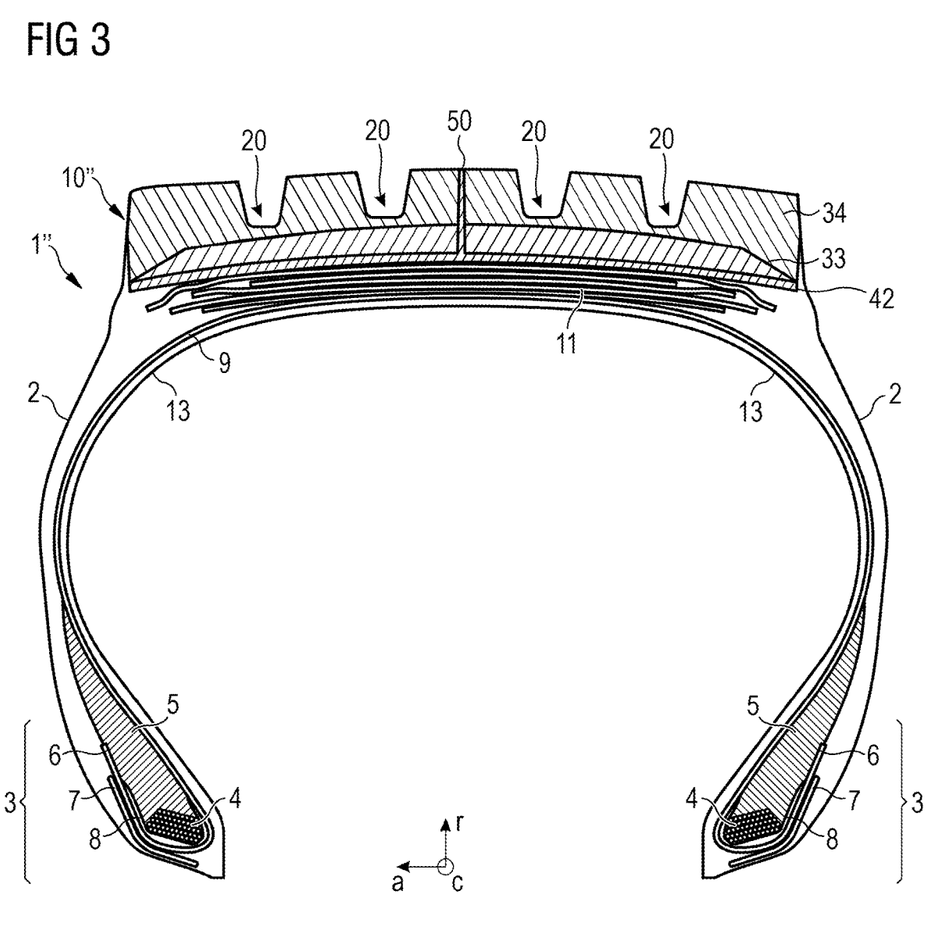
FIG. 3 is a schematic cross section of a tire comprising multiple tread cap layers and a tread base layer having an electrically conductive chimney extending to the radially outermost side of the tread.

FIG. 3 depicts a third embodiment of a tire 1" comprising a tread 10" with a tread base layer 42 having a (electrically conductive) chimney 50, radially extending to the outermost top of the tread 10" in a rib formed between two grooves 20. Electrically conductive chimneys are known as such in order to provide electrical conductivity through radially outer (most) tread layers, such as tread layers 33, 34 shown in FIG. 3 to the base layer 42. For this purpose, the tread base layer 42 can for instance have a carbon black content which is at least 40 phr or at least 45 phr which is one way to render the compound of the base layer electrically conductive. This may be of particular, interest in case of not sufficiently conductive tread layers contacting the road when driving (e.g. in case of fully silica reinforced compounds). In particular, such a conductive chimney does not act as groove reinforcement of a tire as it typically does not contact the sidewalls of the grooves 20. Such an arrangement might increase the risk of groove cracking. In the depicted embodiment, the compounds of the tread cap layers 33, 34 and the tread base layer 42 could be the same as in the embodiment of FIG. 2. As is illustrated in FIG. 3 the tread base layer 42 extends under the entire axial width of the first tread cap layer 33 which extends under the entire axial width of the second tread cap layer 34. Accordingly, the tread base layer 42 extends under the entire axial width of both the first tread cap layer 33 and the second tread cap layer 34.

Figure 4:
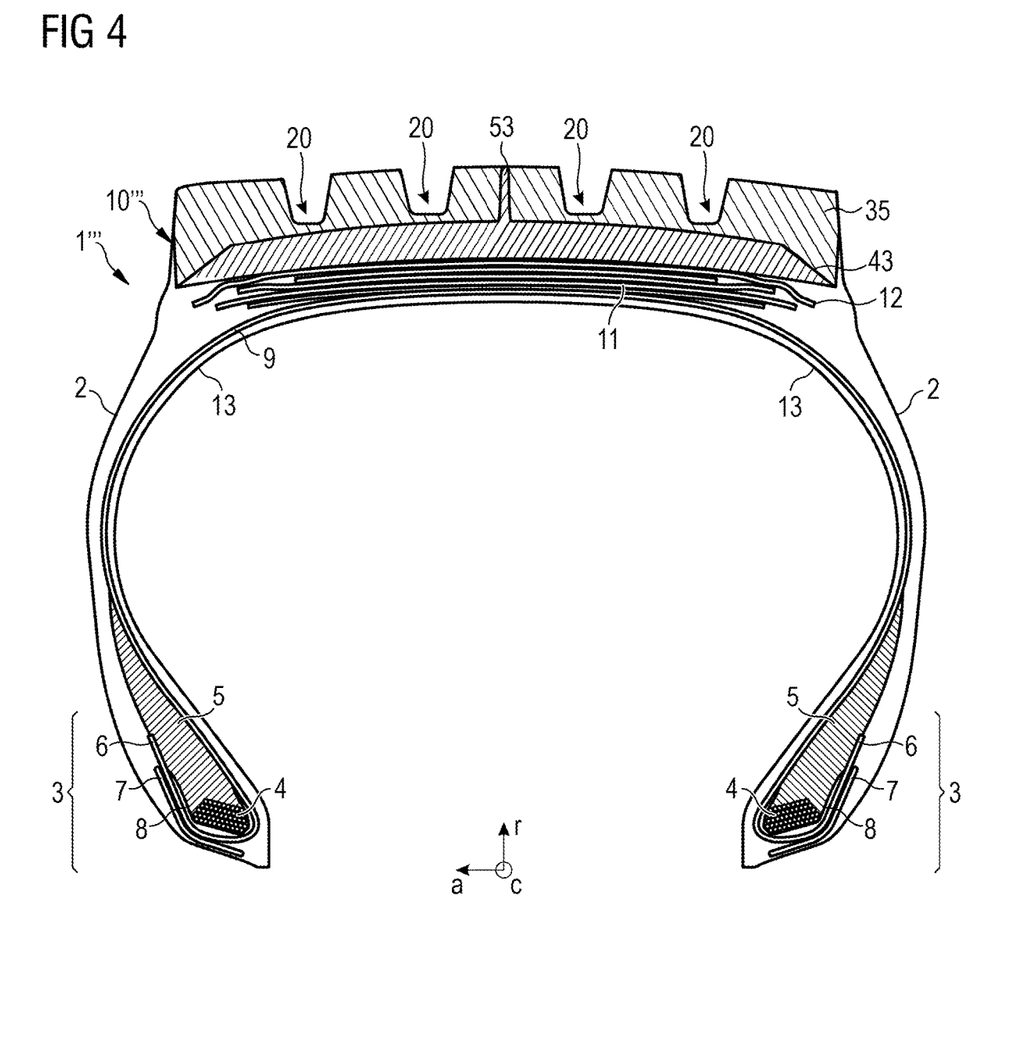
FIG. 4 is a schematic cross section of a tire comprising two tread cap layers wherein the radially inner tread cap layer, in accordance with an embodiment of the invention, comprises a conductive chimney extending to the radially outermost side of the tread.

FIG. 4 depicts a fourth embodiment of a tire 1''' comprising a tread 10''' with a radially inner tread cap layer 43 and a radially outer tread cap layer 35 supported by the radially inner tread cap layer 43. Similar to the embodiment of FIG. 3, the tread 10''' of FIG. 4 comprises a conductive chimney 53, whereas the conductive chimney 53 of the embodiment of FIG. 4 extends from the inner tread cap layer 43 instead from the base layer 42. In particular, the embodiments according to FIGS. 1 and 4 do not have a tread base layer. Such tread base layers may be desired in some cases (e.g. for an increased tack between the belt and the tread cap) but are preferably not necessarily required for the compounds of the radially inner tread layers in accordance with the present invention. In particular, the second compound of the radially inner layer (such as radially inner tread layer 43) as described herein is deemed to have sufficient tack to omit a further base layer if desired.

Below Table 1 shows compositions which may be used for radially inner tread layers such as a tread base layer or radially inner tread cap layer supporting one or more radially outer tread layers. Control Sample 1, Control Sample 2 and the Inventive Examples comprise a combination of natural rubber, polybutadiene and carbon black. Control Sample 1 and the Inventive Examples comprise also silica and an amount of phenol/phenolic formaldehyde resin in combination with hexamethylenetetramine (i.e. a methylene donor). Control Sample 2 also includes syndiotactic-1,2-polybutadiene as further reinforcing agent. The Inventive Examples comprise an alkyl phenol formaldehyde resin and relatively high amounts of sulfur. Inventive Example 3 comprises in addition a higher amount of Hexamethylenetetramine than Inventive Examples 1 and 2. While the below Inventive Examples 1 to 3 show explicitly compositions comprising natural rubber, it is emphasized that also synthetic polyisoprene may be used in another embodiment of the present invention. Moreover, the inventors have discovered that the use of SSBR instead of natural rubber or synthetic polyisoprene or blends of all these polymers is possible and desirable. However, natural rubber may be considered as the most preferred non-limiting example. Moreover, it is emphasized that compositions comprising essentially carbon black and in particular less than 5 phr silica or even no silica have been found to be also particularly desirable.

TABLE 1

| | Parts by weight (phr) | | | | |
| --- | --- | --- | --- | --- | --- |
| Material | Control Sample 1 | Control Sample 2 | Inventive Example 1 | Inventive Example 2 | Inventive Example 3 |
| Natural Rubber | 80 | 72 | 80 | 80 | 80 |
| Polybutadiene[1] | 20 | 28 | 20 | 20 | 20 |
| Syndiotactic 1,2-Polybutadiene[2] | 0 | 6 | 0 | 0 | 0 |
| Carbon Black | 50 | 53 | 50 | 50 | 50 |
| Precipitated silica | 20 | 0 | 20 | 20 | 20 |
| Silane | 2 | 0 | 2 | 2 | 2 |
| Stearic acid | 3 | 1.5 | 3 | 3 | 3 |
| Antidegradants | 3 | 4 | 3 | 3 | 3 |
| Oil | 15 | 0 | 0 | 0 | 0 |
| Phenol formaldehyde resin[3] | 20 | 2 | 20 | 20 | 20 |
| Alkyl phenol formaldehyde resin[4] | 0 | 0 | 14.5 | 14.5 | 14.5 |
| Hexamethylenetetramine | 3 | 0 | 3 | 3 | 5 |
| Sulfenamide accelerators | 2.4 | 2.9 | 2.4 | 2.4 | 2.4 |
| Fatty acid soap | 2 | 0 | 2 | 2 | 2 |
| ZnO | 2.5 | 2.6 | 2.5 | 2.5 | 2.5 |
| Waxes | 1.5 | 1.5 | 1.5 | 1.5 | 1.5 |
| Sulfur | 1.6 | 2.3 | 2.3 | 3.2 | 2.5 |
| Vulcanization inhibitor | 0.3 | 0.2 | 0.3 | 0.3 | 0.3 |

[1] as Budene ® 1207 polybutadiene rubber from The Goodyear Tire & Rubber Company
[2] as UBEPOL-VCR412 of UBE INDUSTRIES, LTD.
[3] as SMD 30207 M3 from SI group
[4] octyl phenol formaldehyde resin as SP-1068 from SI Group Below Table 2 shows the shear storage modulus values G' of the compounds listed in Table 1. While Control Samples 1 and 2 show relatively high values of more than 2 and 3 MPa, the G' value of the Inventive Example 1 is significantly higher, i.e. above 6 MPa. The G' values of the Inventive Examples 2 and 3 are even higher than 7 MPa. However, the tangent delta values of the Inventive Examples are higher than the tangent delta values of the Control Samples 1 and 2, although deemed still acceptable for a radially inner tread layer.

TABLE 2

| Physical properties | Control Sample 1 | Control Sample 2 | Inventive Example 1 | Inventive Example 2 | Inventive Example 3 |
| --- | --- | --- | --- | --- | --- |
| G' 6% 70° C. [MPa] | 3.36 | 2.39 | 6.1 | 7.0 | 7.9 |
| tanδ 6% 70° C. | 0.25 | 0.08 | 0.29 | 0.28 | 0.28 |

Below Table 3 shows some exemplary compounds which can be utilized in rubber formulations for the radially outer tread layer which is supported by a radially inner layer made of a relatively stiff compound, such as the compounds shown in Inventive Examples 1 to 3. In particular, below Examples 1 to 3 may be considered as examples for high performance compositions. The present invention is not limited to these specific examples of compounds for the radially outer tread layer.

TABLE 3

| | Parts by weight (phr) | | |
| --- | --- | --- | --- |
| Material | Example 1 | Example 2 | Example 3 |
| Polybutadiene[1] | 10 | 10 | 10 |
| Solution SBR[2] | 0 | 50 | 50 |
| Solution SBR[3] | 0 | 40 | 40 |
| Solution SBR[4] | 75 | 0 | 0 |
| 3,4-Polyisoprene | 15 | 0 | 0 |

TABLE 3-continued

| | Parts by weight (phr) | | |
|---|---|---|---|
| Material | Example 1 | Example 2 | Example 3 |
| Silica[5] | 95 | 105 | 56 |
| Carbon black[6] | 20 | 20 | 62 |
| Oil[7] | 31 | 49 | 44 |
| Resin[8] | 8 | 15 | 10 |
| Resin[9] | 0 | 5 | 5 |
| Resin[10] | 8 | 0 | 0 |
| Low MW SBR[11] | 0 | 0 | 11.76 |
| Coupling agent[12] | 6 | 7.6 | 4 |
| Waxes[13] | 1.5 | 1.5 | 1.5 |
| Fatty acids[14] | 3.5 | 5 | 5 |
| Antidegradant[15] | 0.5 | 4.5 | 4.5 |
| Zinc oxide | 2.5 | 2.5 | 2.5 |
| Sulfur | 1.8 | 1.9 | 1.9 |
| Accelerators[16] | 4.7 | 4.9 | 4.3 |

[1] Budene ®1207 polybutadiene rubber from The Goodyear Tire & Rubber Company
[2] SE SLR6430 solution polymerized styrene-butadiene rubber, 40% styrene, 14% vinyl, Tg (OE) = −34° C., 37.5 phr TDAE oil, from Styron.
[3] Tufdene ™ E680 solution polymerized styrene-butadiene rubber, 34% styrene, 38% vinyl, Tg(OE) = −25° C., 37.5 phr SRAE oil, from Asahi Chemical
[4] SE SLR 4630, partially silicon-coupled, solution-polymerized styrene butadiene rubber extended with 37.5 phr TDAE oil, typical properties reported as 25 percent by weight of styrene and 63 percent by weight vinyl (of butadiene segments), Tg = −28.9° C., Mooney ML 1 + 4 (100° C.) = 55, from the Dow Chemical Company
[5] Precipitated Silica, BET Nitrogen Surface Area = 160 m2/g
[6] Furnace black with iodine absorption number = 202 g/kg (ASTM D-1510), oil absorption number = 134 cm$^3$/kg (ASTM D-2414)
[7] RAE, SRAE & TDAE oil
[8] Alphamethyl styrene resin, as Resin 2336 from Eastman
[9] Dimerized gum rosin, as Dymerex from Eastman
[10] coumarone-indene resin
[11] Ricon ® 100 low molecular weight styrene-butadiene copolymer, 25% styrene, 70% vinyl, MW = 4500, from Cray Valley
[12] 50% Bis(triethoxysilylpropyl) tetrasulfide on carbon black
[13] Microcrystalline & paraffinic waxes
[14] fatty acids, fatty acid zinc salts, and fatty acid glycerides
[15] p-phenylenediamine and quinoline types
[16] Sulfenamide and guanidine type A fourth example, Example 4, is given below in Table 4. This example may be considered as an example for a tread (cap) composition that is designed to have low rolling resistance.

TABLE 4

| Material | Parts by weight (phr) Example 4 |
|---|---|
| SBR[a] | 49 |
| SBR[b] | 30 |
| Natural Rubber | 21 |
| Silica[c] | 65 |
| Silane[d] | 5.2 |
| Silane[e] | 2 |
| Liquid polymer[f] | 4 |
| TDAE oil | 9 |
| Sunflower oil | 3 |

[a] Solution polymerized SBR with styrene content of 21% and 1,2-vinyl content of 50%, Tg = −23° C. obtained from Trinseo as SLR4602
[b] Solution polymerized SBR with styrene content of 30% and 1,2-vinyl content of 41%, Tg = −22.4° C. extended with 20 phr TDAE oil, obtained as SLF30H41-66C from The Goodyear Tire & Rubber Company
[c] Zeosil Premium 200MP from Solvay
[d] S-octanoylmercaptopropyltriethoxysilane, as NXT* from Momentive
[e] TESPD type silane coupling agent, 50% on carbon black as X50S from Evonik
[f] Polybutadiene end functionalized with triethoxysilyl groups, Mw = 3000, Tg = −35 C., as Ricon 603 from Cray Valley Below Table 5 provides G' and tangent delta values for the exemplary radially outer tread layer compounds listed in Tables 3 and 4. The respective G' values are considerably smaller than those of the base layer compounds in accordance with Table 2. The tangent delta values of Examples 1 to 3 are relatively high which is typical for high performance tread compounds, whereas the tangent delta value for Example 4 is very low in view of the fact that this compound is designed as low rolling resistance compound, in particular including a low filler amount and little to no carbon black.

TABLE 5

| Physical properties | Example 1 | Example 2 | Example 3 | Example 4 |
|---|---|---|---|---|
| G' 6% 70° C. [MPa] | 2 | 1.5 | 1.4 | 1.5 |
| tanδ 6% 70° C. | 0.22 | 0.27 | 0.33 | 0.08 |

Below Table 6 shows tire test results for cornering stiffness and dry grip of the compounds according to Control Sample 1 and the Inventive Example 1. With the same tire construction including a tread base layer made of either the composition in accordance with Control Sample 1 or the Inventive Example 1 and one radially outer tread cap layer, the values for cornering stiffness and dry grip have significantly been improved by the Inventive Example 1 over the Control Sample.

TABLE 6

| Tire Test Results | Control Sample 1 | Inventive Example 1 |
|---|---|---|
| Tire Cornering Stiffness @2.7 bar inflation [N/deg] | 3388 | 3591 |
| Tire Cornering Stiffness @2.9 bar inflation [N/deg] | 3040 | 3253 |
| F$_y$ max (dry grip) @2.7 bar inflation [N] | 3212 | 3394 |
| F$_y$ max (dry grip) @2.9 bar inflation [N] | 2886 | 3106 |

Variations in the present invention are possible in light of the provided description. While certain representative embodiments, examples and details have been shown for the purpose of illustrating the subject invention, it will be apparent to those skilled in this art that various changes and modifications can be made therein without departing from the scope of the invention. It is, therefore, to be understood that changes may be made in the particular example embodiments described which will be within scope of the invention as defined by the appended claims.

What is claimed is:

1. A tire comprising a belt portion and a tread portion, wherein the tread portion is situated radially outward from the belt portion, wherein the tread portion comprises a radially outer tread cap layer, which is adapted to be ground contacting, and a radially inner tread cap layer arranged between the radially outer tread cap layer and the belt portion, wherein the radially inner tread cap layer extends under the entire axial width of the radially outer tread cap layer,
  wherein the radially outer tread cap layer comprises a first rubber composition having a first shear storage modulus G'1, wherein the first rubber composition includes carbon black and silica, and wherein the weight ratio of the silica to the carbon black is at least 10:1,
  wherein the radially inner tread cap layer comprises a second rubber composition having a second shear storage modulus G'2,
  wherein the second shear storage modulus G'2 is between 3 MPa and 9 MPa higher than the first shear storage modulus G'1, and
  wherein the first shear storage modulus G'1 ranges from 1 MPa to 3 MPa and the second shear storage modulus G'2 ranges from 4 MPa to 12 MPa, and wherein the first shear storage modulus G'1 and the second shear storage modulus G'2 are determined according to ASTM D5992, wherein said tire is further comprising a plurality of circumferential grooves and circumferential ribs, wherein two neighboring circumferential grooves define a circumferential rib, and wherein the radially inner tread layer comprises an electrically conductive chimney extending to the radially outermost surface of the tread portion for contacting the road when driving, and wherein the conductive chimney extends radially through one of the ribs and is axially spaced apart from the neighboring grooves.

2. The tire of claim 1 wherein the first shear storage modulus G'1 is within the range of 1 MPa to 2.5 to MPa.

3. The tire of claim 1 wherein the second shear storage modulus G'2 is within the range of 5.5 MPa to 10 MPa.

4. The tire of claim 1 wherein the second shear storage modulus G'2 is within the range of 3.5 MPa to 6 MPa higher than the first shear storage modulus G'1.

5. The tire of claim 1 wherein the first shear storage modulus G'1 is within the range of 1 MPa to 2.5 to MPa, the second shear storage modulus G'2 is within the range of 5.5 MPa to 9 MPa, and wherein the second shear storage modulus G'2 is 3.5 MPa to 7 MPa higher than the first shear storage modulus G'1.

6. The tire of claim 1 further comprising a plurality of circumferential grooves, wherein the radially inner tread layer is free of radial extensions contacting the circumferential grooves.

7. The tire of claim 1 wherein the radially inner tread layer is free of any radial extension extending radially into the radially outer tread layer.

8. The tire of claim 1 wherein the first rubber composition has a tangent delta which is higher than 0.2, as determined according to ASTM D5992.

9. The tire of claim 8 wherein the first rubber composition has a tangent delta that ranges from 0.2 to 0.4.

10. The tire of claim 1 wherein the first rubber composition has a tangent delta that ranges from 0.05 to 0.15 as, determined according to ASTM D5992.

11. The tire of claim 1 wherein the radially inner tread layer has over at least 90% of its axial width a radially thickness ranging from 20% to 80% of the maximum radial thickness of the radially outer tread layer.

12. The tire of claim 1 wherein the second rubber composition comprises: from 75 phr to 90 phr of an elastomer selected from one or more of cis-1,4-polyisoprene having a cis content of more than 90% and a solution polymerized styrene-butadiene rubber, from 10 phr to 25 phr of cis-1,4 polybutadiene rubber having a glass transition temperature ranging from −85° C. to −110° C., from 40 phr to 80 phr of a filler comprising from 40 phr to 80 phr carbon black and from 0 phr to 40 phr silica, less than 10 phr of plasticizer, from 20 phr to 50 phr of a methylene acceptor composition comprising a phenol formaldehyde and an alkyl phenol formaldehyde, and from 1 phr to 10 phr of a methylene donor composition comprising hexamethylenetetramine.

13. The tire of claim 12 wherein the second rubber composition comprises:

from 45 phr to 70 phr of the filler comprising from 45 phr to 70 phr carbon black and from 0 phr to 25 phr silica, from 25 phr to 45 phr of the methylene acceptor composition comprising the phenol formaldehyde and the alkyl phenol formaldehyde, from 1 phr to 5 phr of the methylene donor composition comprising the hexamethylenetetramine, and from 1.5 phr to 4 phr of sulfur.

14. The tire of claim 12 wherein the methylene acceptor composition comprises from 15 phr to 25 phr of the phenol formaldehyde, from 12 phr to 17 phr of octyl phenol formaldehyde, and the second rubber composition comprises from 2 phr to 4 phr sulfur.

15. The tire of claim 12 wherein the second rubber composition comprises from 2 phr to 4 phr of the methylene donor composition comprising the hexamethylenetetramine, and wherein the ratio between the methylene acceptor composition and the methylene donor composition ranges from 10:1 to 15:1.

16. The tire of claim 12 wherein the alkyl phenol formaldehyde has a softening point ranging from 80° C. to 100° C. and the phenol formaldehyde has a softening point ranging from 100° C. to 120° C.

17. The tire of claim 1 wherein the first rubber composition optionally contains a resin and wherein the resin is present at a level of lower than 10 phr.

18. A tire comprising a belt portion and a tread portion, wherein the tread portion is situated radially outward from the belt portion, wherein the tread portion comprises a radially outer tread cap layer, which is adapted to be ground contacting, and a radially inner tread cap layer arranged between the radially outer tread layer and the belt portion, wherein the radially inner tread cap layer extends under the entire axial width of the radially outer tread cap layer, wherein the radially outer tread cap layer comprises a first rubber composition having a first shear storage modulus G'1, wherein the first rubber composition includes carbon black and optionally silica, and wherein the weight ratio of the silica to the carbon black is at least 10:1;

wherein the radially inner tread cap layer comprises a second rubber composition having a second shear storage modulus G'2, wherein the second rubber composition is comprised of 75 phr to 90 phr a solution polymerized styrene-butadiene rubber, 10 phr to 25 phr of cis-1,4 polybutadiene rubber having a glass transition temperature which is within the range of −85° C. to −110° C., 45 phr to 70 phr of a filler comprising from 45 phr to 70 phr carbon black and from 0 phr to 25 phr silica, less than 10 phr of plasticizer, 25 phr to 45 phr of a methylene acceptor composition comprising a phenol formaldehyde and an alkyl phenol formaldehyde, 1 phr to 5 phr of a methylene donor composition comprising a hexamethylenetetramine, and 2 phr to 4 phr sulfur;

wherein the second shear storage modulus G'2 is between 3 MPa and 9 MPa higher than the first shear storage modulus G'1;

wherein the first shear storage modulus G'1 ranges from 1 MPa to 3 MPa and the second shear storage modulus G'2 ranges from 4 MPa to 12 MPa, and wherein the first shear storage modulus G'1 and the second shear storage modulus G'2 are determined according to ASTM D5992.

19. The tire of claim 18 wherein the solution polymerized stryrene-butadiene rubber is thio-functionalized.

* * * * *